Figure 1:
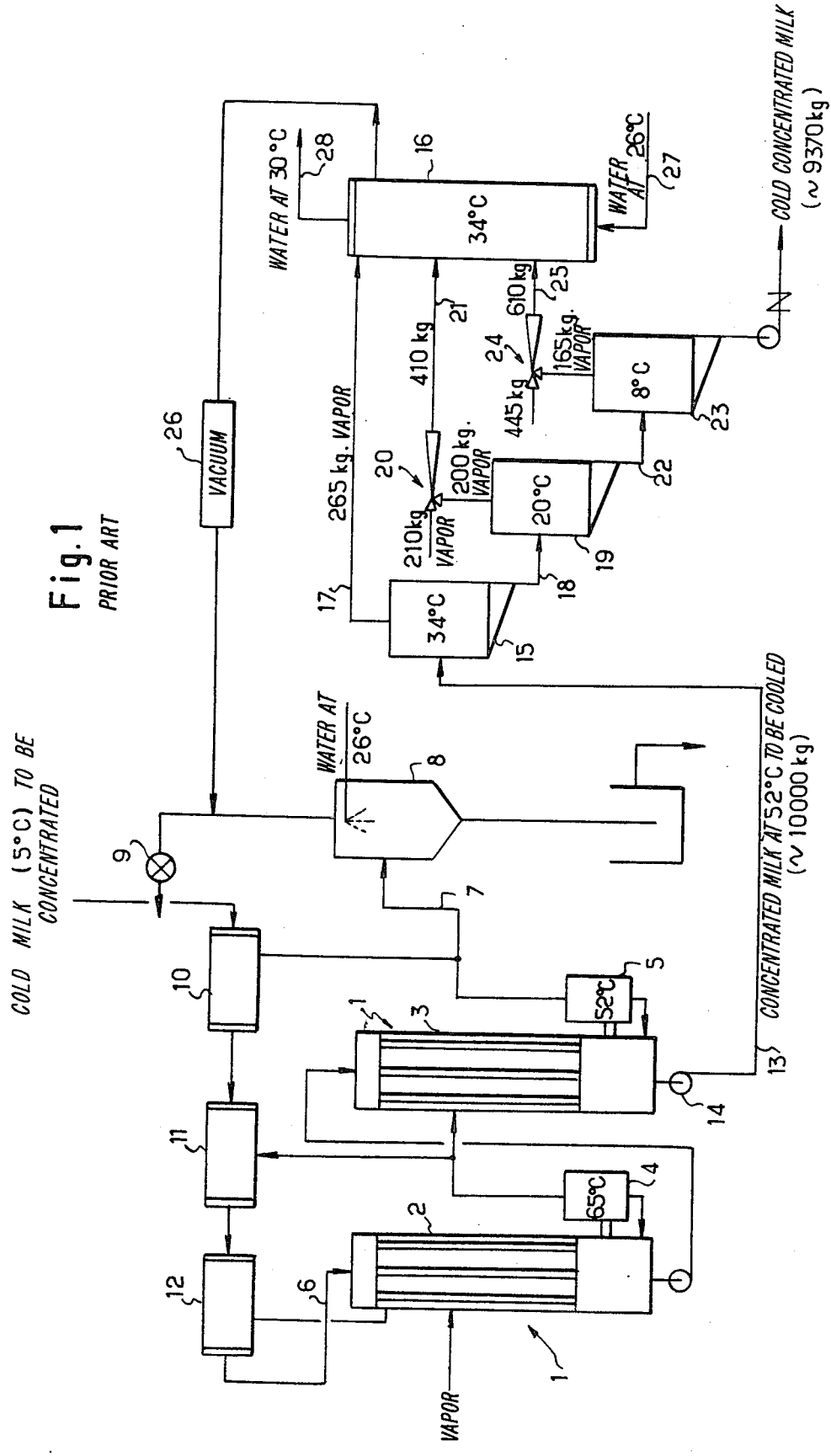

United States Patent [19]

Ciboit et al.

[11] 4,267,015

[45] May 12, 1981

[54] PROCESS FOR COOLING HOT CONCENTRATED MILK COMING FROM AN EVAPORATOR, BY EXPANSION BY STAGES

[76] Inventors: Jacques J. Ciboit, 164 bis, rue de l'Université, 75007 Paris; Pierre R. Laguilharre, 6, rue Robin, 95880 Enghien les Bains, both of France

[21] Appl. No.: 28,859

[22] Filed: Apr. 10, 1979

[30] Foreign Application Priority Data

Apr. 11, 1978 [LU] Luxembourg .......................... 79411

[51] Int. Cl.³ .......................... B01D 1/26; B01D 1/28
[52] U.S. Cl. .......................... 159/47 R; 159/17 VS; 159/24 B; 159/17 R; 159/2 MS; 426/492
[58] Field of Search ................ 159/17 R, 17 VS, 2 R, 159/2 MS, 24 B, 24 A, 47; 426/491, 492; 203/24

[56] References Cited

U.S. PATENT DOCUMENTS

| | | | |
|---|---|---|---|
| 2,459,302 | 1/1949 | Aronson | 159/17 VS |
| 2,759,882 | 8/1956 | Worthen et al. | 159/24 R |
| 3,185,580 | 5/1965 | Hanrahan et al. | 159/24 A |
| 3,489,654 | 1/1970 | Geiringer | 159/DIG. 8 |

Primary Examiner—Norman Yudkoff
Attorney, Agent, or Firm—Finnengan, Henderson, Farabow, Garrett & Dunner

[57] ABSTRACT

A process for cooling a hot concentrated product coming from an evaporator comprising evaporation means and a condenser, in relation with a vacuum source, which consists in providing expansion by stages at decreasing pressures during which the hot concentrated product is cooled by stages, a process which can be used in the case where the product before concentration is available at low temperature.

It is characterized in that with each expansion step there is associated a condenser where the vapor released at each corresponding expansion step is condensed, at least one of said condensers having passing therethrough a low temperature product, the product thus reheated being then fed to said evaporator for concentration.

11 Claims, 4 Drawing Figures

PROCESS FOR COOLING HOT CONCENTRATED MILK COMING FROM AN EVAPORATOR, BY EXPANSION BY STAGES

The present invention has as its subject a process for cooling a hot concentrated product, notably milk, coming from an evaporator comprising evaporation means and a condenser in relation with a vacuum source, which consists in providing expansion by stages at decreasing pressures during which the hot concentrated product is cooled by stages and which can be used in the case where the product before concentration is available at low temperature.

In the food industry, particularly in the milk industry, it is often desirable to concentrate products, available at low temperature, for preservation purposes. This is in particular the case with milk. This operation is, for example carried out in an evaporator, the resulting concentrated product leaving at a relatively high temperature (of the order of 45° to 60° C. in the case of milk). But, for questions of preservation of this concentrated product, it is often required to lower the temperature thereof (to about 5°–15° C. in the case of milk).

For this, it is known to use a cooling process of the above type in which the vapour released by the successive expansions is directed towards the condenser through which passes cooling water, the first expansion step being directly connected to this condenser and the following steps being connected to this same condenser by a thermocompressor system. This process presents serious disadvantages in that it requires an heavy expenditure of vapour (thermocompressors) and cooling water.

To palliate these disadvantages, the present invention proposes an improvement to the above expansion cooling process, and which is characterized by the fact that with each expansion step there is associated a condenser where the vapour released at each corresponding expansion step is condensed, said low temperature product passing through at least one of said condensers, the product thus reheated being then fed into said evaporator for concentration.

It is to be noted that the low temperature product passes through the condensers in series and in the direction of increasing pressures.

By using a cooling product having a temperature lower than that of the cooling water used in the prior art, and in particular the use of available cold milk, it is possible to eliminate the use of thermocompressors, i.e. to make a considerable economy in vapour. Moreover, it is no longer necessary to use cooling water, as in the known process, and the new process consumes less condensation water since the amount of vapour to be condensed is less in relation to that to be condensed in the known process (the reason is the elimination of the thermocompressors).

It will again be noticed that because of the successive expansions, the cooled concentrated product is more concentrated than the hot product which is to be cooled.

According to one embodiment of the invention, the vacuum for providing the successive expansions is applied at the level of the lowest pressure condenser, the different condensers being furthermore connected by degasing pipes.

According to another embodiment, the vacuum source causing the successive expansions is the same as that of the condenser of the evaporator, an auxiliary vacuum system for increasing to the pressure of the condenser of the evaporator being disposed between this vacuum source and the condenser where the reheating of the low temperature product takes place. This arrangement has then the advantage of requiring only one single vacuum source end, therefore, of avoiding complication of the installation.

Advantageously, the vacuum source and/or the auxiliary vacuum system are formed by vapour ejectors.

Furthermore, the condensers where the reheating of the low temperature product takes place are surface condensers.

According to a variation, the condensers may be of the mixing type, less expensive. It is noted however that the reheated product to be concentrated is slightly diluted. But the extra vapour required for the evaporation of this dilution water in a multiple effect evaporator is low.

In the case where the temperature and/or the flow rate of the low temperature product to be concentrated do not allow the desired temperature to be reached for cooling the concentrated product, the low temperature product only passes through some of the condensers on the highest pressure side, the remaining condenser(s) on the lowest pressure side having then flowing therethrough another cooling product having a temperature sufficiently low to obtain the desired temperature for cooling of the concentrated product.

In particular, this cooling product may circulate in a closed circuit in a refrigerating installation.

Figure 2:
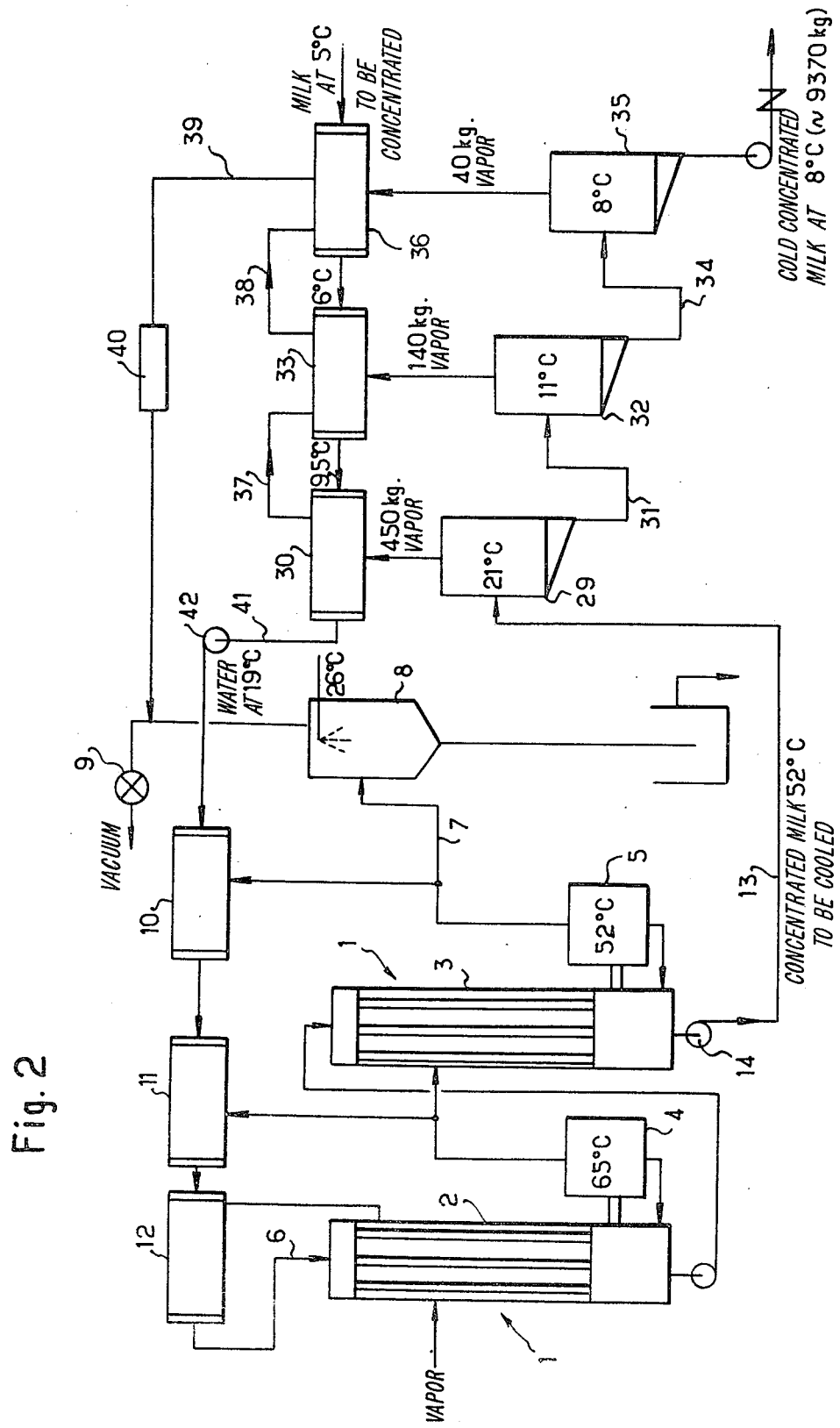
Figure 3:
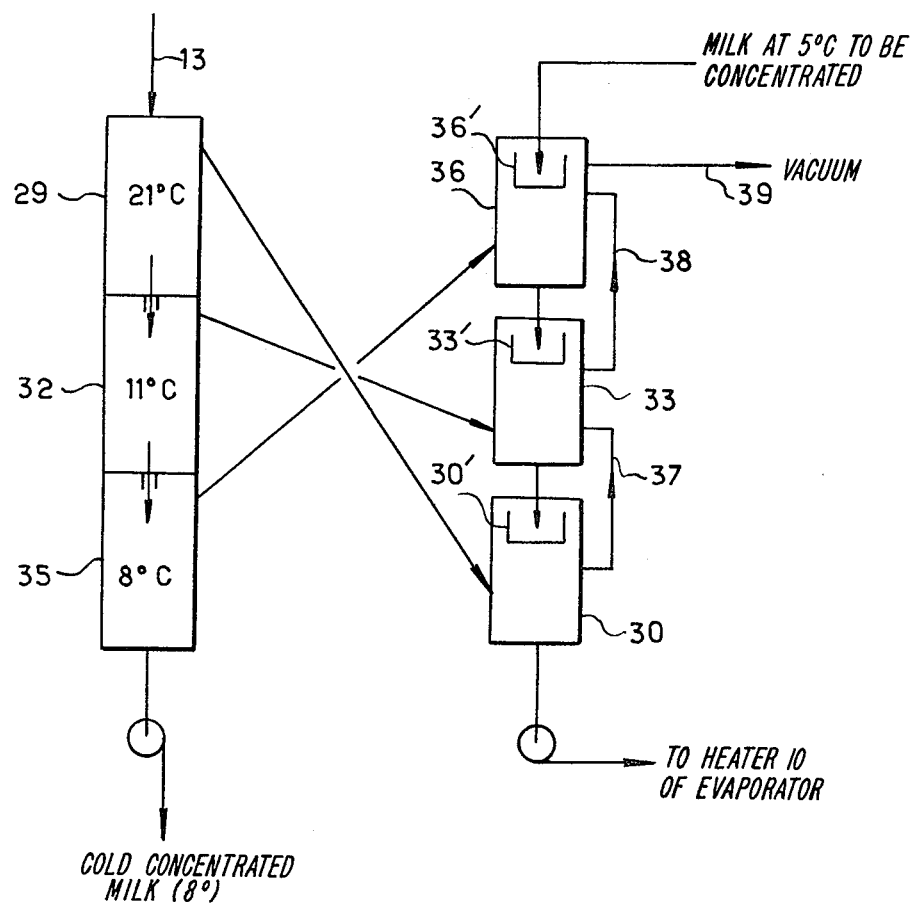
Figure 4:
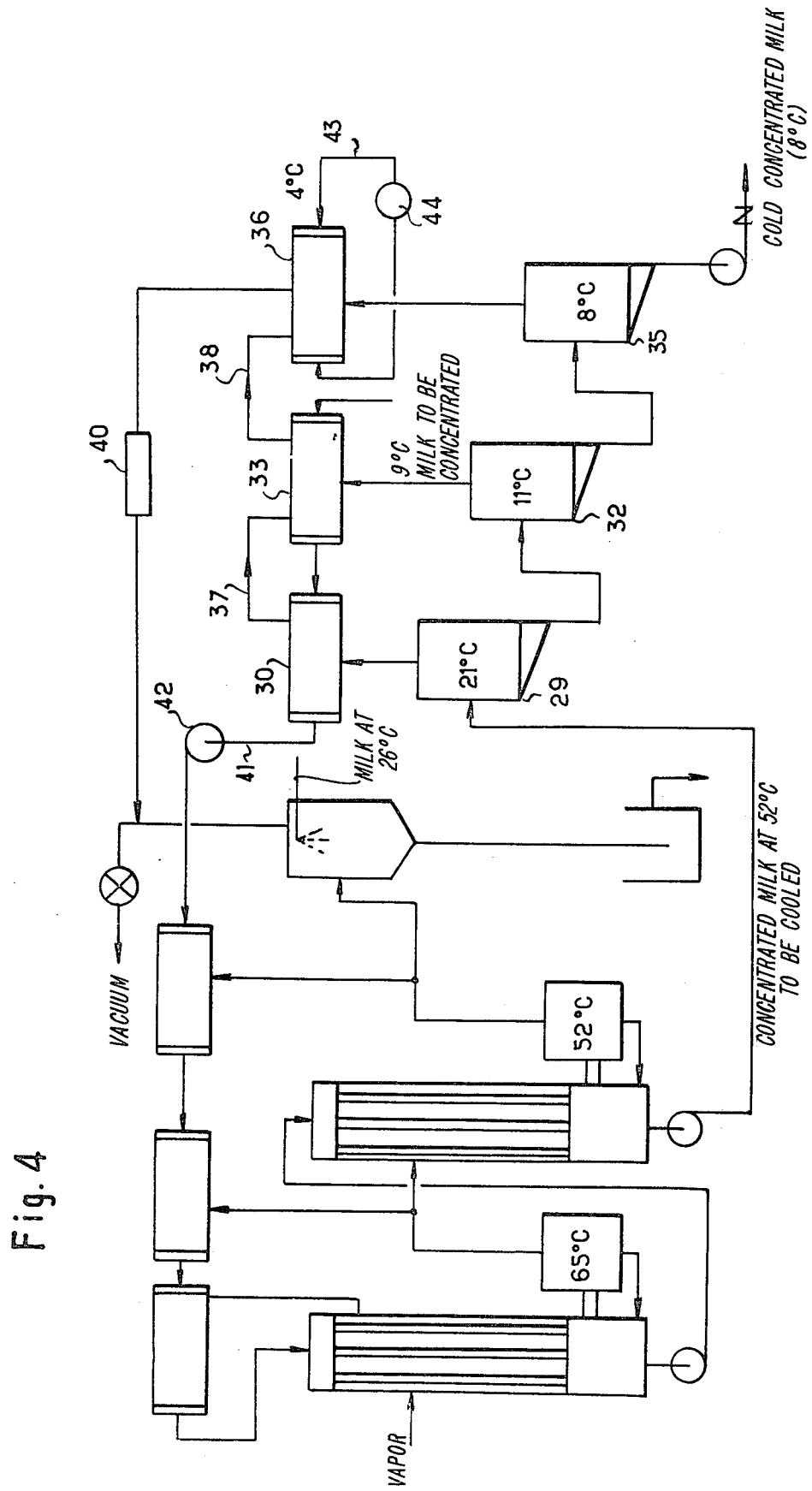

To illustrate the invention, the accompanying drawings show:

in FIG. 1, an installation for implementing the previously known process, in FIG. 2, an installation for implementing the process of the invention, in FIG. 3, a variation of the installation of FIG. 2 (evaporator not shown) and in which the condensers where the reheating of the low temperature product takes place are mixing condensers, and in FIG. 4, a variation of the installation of FIG. 2, where only some of the condensers have passing therethrough the low temperature product to be concentrated.

As can be seen in FIG. 1, the installation shown comprises an evaporation section (left hand part) and a cooling section (right hand part).

The evaporation section comprises a well known evaporation system of the falling flow double acting type 1 comprising two evaporation bodies 2 and 3 with which are associated respectively separators 4 and 5. It is obvious that other evaporation systems may be used (for example of the single action or more than two action type and/or of the rising flow type). The product to be concentrated, in this case milk, is brought to the first evaporation body 2 by pipe 6.

The vapour from separator 5 is brought by a pipe 7 to a condenser 8 where it is condensed by water, at 26° C. in the present case. The evaporation system 1 and condenser 8 are maintained under vacuum by a vacuum device 9. A part of the vapour from separator 5 and from separator 4 is used for supplying respectively reheaters 10 and 11 disposed in series and in which cold milk (5° C.) to be concentrated circulates. The cold milk gradually reheated finally arrives at a third reheater 12 fed with vapour from the first evaporation body 2. The preheated milk leaving this reheater 12 is then fed to the top of this first evaporator body 2 by pipe 6.

The hot concentrated milk leaving the evaporation system (in the present case about 10000 kg at 52° C.) is fed by pipe 13 through a pump 14 to a first expansion tank 15; the milk undergoes therein a first cooling (passing from 52° C. to 34° C.). The vapour produced in this expansion tank 15 (265 kg) is fed to a condenser 16 by means of pipe 17. The cooled milk from the first expansion tank 15 is brought by pipe 18 to a second expansion tank 19 where it undergoes a second cooling (passing from 34° C. to 20° C.). The expansion in this tank 19 is caused by thermocompressor 20. The vapour from this latter (200 kg of vapour released by the milk and 210 kg of vapour required for operating the thermocompressor 20, i.e. a total of 410 kg) is fed to condenser 16 by a pipe 21. Finally, the milk at 20° C. from the second expansion tank 19 is brought, through a pipe 22, to a third expansion tank 23, where it undergoes a last cooling (passing from 20° C. to 8° C.), the expansion being caused therein by a thermocompressor 24. The vapour from this latter (165 kg of vapour released by the milk and 445 kg required for operating the thermocompressor 24, i.e. a total of 610 kg) is also fed to condenser 16 by a pipe 25. From the base of this tank 23 is drawn about 9370 kg of concentrated milk at 8° C.

Condenser 16 is in relation with the vacuum source 9 of the evaporator through an auxiliary vacuum system 26 which allows the pressure to be raised up to that of condenser 8 of evaporator 1. Moreover, this condenser 16 is supplied with water at 26° C. arriving through a pipe 27 leaves this condenser 16, at 30° C., through a pipe 28.

The evaporation section of FIG. 2 (left hand part) comprises the same means having references 1 to 14 as those of FIG. 1.

However, the hot concentrated milk leaving the evaporation system (about 10000 kg at 52° C.) is fed by pipe 13 to an expansion tank 29 where said milk is cooled (passing from 52° C. to 21° C.). The vapor released by this expansion and which is at 21° C. (450 kg) is fed to a first condenser 30. Having undergone a first cooling in tank 29, the milk is fed, via a pipe 31, to a second expansion tank 32. The milk undergoes a second cooling therein (passing from 21° C. to 11° C.) and the vapour at 11° C. released by this expansion (140 kg) is fed to a second condenser 33. Finally, the milk at 11° C. from tank 32 is fed, via a pipe 34, to a third expansion tank 35, where it undergoes a third cooling (passing from 11° C. to 8° C.), the vapour at 8° C. thus released (40 kg) being fed to a third condenser 36. Condenser 30 is provided with a degasing pipe 37 in relation with condenser 33, this latter being also provided with a degasing pipe 38 in relation with condenser 36.

Condenser 36 is moreover provided with a pipe 39 connected to an auxiliary vacuum system 40, itself connected to the vacuum system 9 of the evaporator, this vacuum system 40 allowing the pressure to be raised to the pressure of the condenser of the evaporator. Finally, condensers 36, 33 and 30 have passing therethrough in series and in the direction 36→33→30 cold milk to be concentrated and available at 5° C. At the outlet of condenser 36, this milk is at 6° C., at the outlet of condenser 33 it is at 9.5° C. and at the outlet of condenser 30, it is at 19° C., after which it is fed, by means of pipe 41 and pump 42, to the reheaters 10, 11 and 12 for feeding through pipe 6 to the first evaporation body 2.

The vacuum system applied to condenser 16 (case of FIG. 1) or condenser 36 (case of FIG. 2) may of course by a system independent of the vacuum source 9 of the evaporator.

Furthermore, condensers 16, 30, 33 and 36 may be surface or mixing condensers.

Such being the case, it can be noted that in the case of the known process (FIG. 1), to cool ≃10000 kg of concentrated milk from 52° C. to 8° C., the vapour consumption is 210+445=655 kg, the amount of vapour to be condensed in a vacuum deeper than that of the evaporator being 265+(200+210)+(445+165)=1285 kg.

In accordance with the process of the invention (FIG. 2), the cooling of ≃10000 kg of concentrated milk at 52° C. to a temperature of 8° C. requires the use of no vapour. With respect to the prior art, the gain is then 655 kg of vapour.

Furthermore, the consumption of water is less in the claimed process.

In fact, in the prior art process, it is necessary to use water (at 26° C.) for condensing the amount of vapour (x) arriving in condenser 8 of the evaporator and the amount of vapour (1285 kg) arriving in condenser 16 which is under a deeper vacuum.

On the contrary, in the process of the invention, the amount of water (26° C.) required is solely that required for condensing (x+630 kg) of vapour in the vacuum of the condenser of the evaporator.

It appears then that the economy in water is considerable.

As mentioned previously, condensers 30, 33 and 36 may be mixing condensers. This case is illustrated by FIG. 3 where only the cooling section has been shown.

References 13, 29, 30, 32, 33, 35, 36, 37, 38 and 39 have the same significance as in FIG. 2. The expansion tanks 29, 32 and 35 disposed in the present case above each other in the order 35→32→29, are as previously associated respectively with condensers 30, 33, 36 disposed one above the other in the order 30→33→36.

The concentrated milk to be cooled is fed by pipe 13 to the upper part of tank 29 where it is cooled once (52° C.→21° C.), then passes into tank 32 where it is cooled a second time (21° C.→11° C.) and finally into tank 35 where it reaches its final temperature (8° C.).

The milk at 5° C. to be concentrated is, as far as it is concerned, discharged onto a plate 36' disposed at the top of condenser 36. The milk is thus as it were atomized at the top of this condenser, the atomized milk then coming into intimate contact with the vapour, which results in an efficient condensation. The situation is the same in the lower condensers 33 and 30, the milk coming from the base of condenser 36 being discharged onto a plate 33' disposed at the top of condenser 33 and the milk from the base of condenser 33 being discharged onto a plate 30' disposed at the top of condenser 30.

It will be noted that the reheated product to be concentrated leaving at the base of condenser 30 is slightly diluted by the 630 kg of condensed vapour. This leads to a greater evaporation in the evaporator, but the amount of vapour required for this additional evaporation in a multiple action evaporator is low.

The variation shown in FIG. 4 illustrates the case where the temperature of the milk to be concentrated (9° C.) available is insufficient to reach the desired temperature for cooling the concentrated product (8° C.). This FIG. 4 is identical to FIG. 2, except for the fact that the milk at 9° C. to be concentrated does not pass in series through condensers 33 and 30. Condenser 36 at the lowest pressure has, as far as it is concerned, passing therethrough a cooling liquid at 4° C. which circulates in a closed circuit 43 including a refrigerating installation 44.

It is evident that if there was only cold milk to be concentrated at about 11° C., this latter would only be introduced at the level of condenser 30, condensers 33 and 36 having then passing therethrough in series another cooling liquid, for example at 5° C., circulating in a closed circuit including the refrigerating installation 44.

Finally, an installation of the above type (one or two condensers through which passes a cooling liquid other than cold milk (5° C.) to be concentrated) would also be required in the case where the cold milk flow rate is insufficient to reach the desired temperature for cooling the concentrated product.

What is claimed is:

1. A process for concentrating a liquid comprising:
   evaporating and concentrating an incoming cool liquid in a multi-effect evaporator;
   eliminating vapor resulting from said evaporation and concentrating step;
   cooling the hot concentrated liquid in expansion stages under decreasing pressure;
   interacting the vapor from an expansion stage in a condenser for preheating the incoming cool liquid prior to the multi-effect evaporator and further concentrating said concentrated liquid in the expansion stage; and
   eliminating vapor resulting from said interacting step.

2. The process of claim 1 including the step of interacting vapor from each expansion stage in condensers individual to the expansion stages with the incoming cool liquid for heating the incoming cool liquid in stages.

3. The process of claim 2, wherein the incoming cool liquid is passed in series and in the direction of increasing pressure through said individual condensers.

4. The process of claim 3, wherein expansions in the successive expansion stages are induced by applying a vacuum to the condenser at the lowest pressure, the different condensers being furthermore connected by degasing pipes.

5. The process of claim 3, 4, or 2 wherein the evaporation and concentration of the incoming cool liquid is conducted with relation to a vacuum from a vacuum source, and wherein said hot concentrated product is cooled in successive stages under decreasing pressure with relation to the same vacuum source.

6. The process as claimed in claim 5, characterized in that the vacuum source and/or the auxiliary vacuum source utilize vapour injectors.

7. The process as claimed in claim 5 characterized in that the vacuum source and/or the auxiliary vacuum source utilize vapor injectors.

8. The process of claim 2 wherein supplemental vacuum from an auxiliary vacuum source is applied to the condenser individual to the expansion stage utilizing the lowest pressure.

9. The process as claimed in claim 2, wherein the condensers are surface condensers.

10. The process as claimed in claim 2, wherein the condensers are mixing condensers.

11. The process of claim 1 including the steps of interacting vapor from a part of the expansion stages in condensers individual to said part of the expansion stages with the incoming cool liquid for heating the incoming cool liquid and interacting vapor from another part of the expansion stages in condensers individual to said another part of the expansion stages with an independent cool liquid.

* * * * *